(12) United States Patent
Mishima

(10) Patent No.: US 8,090,986 B2
(45) Date of Patent: Jan. 3, 2012

(54) SYSTEM MODULE AND DATA RELAY METHOD

(75) Inventor: Masahiro Mishima, Kawasaki (JP)

(73) Assignee: Fujitsu Limited, Kawasaki-Shi (JP)

( * ) Notice: Subject to any disclaimer, the term of this patent is extended or adjusted under 35 U.S.C. 154(b) by 340 days.

(21) Appl. No.: 12/219,861

(22) Filed: Jul. 29, 2008

(65) Prior Publication Data

US 2008/0288816 A1    Nov. 20, 2008

Related U.S. Application Data

(63) Continuation of application No. PCT/JP2006/302475, filed on Feb. 13, 2006.

(51) Int. Cl.
*G06F 11/00* (2006.01)
(52) U.S. Cl. ........................................... 714/18
(58) Field of Classification Search ...................... 714/18
See application file for complete search history.

(56) References Cited

U.S. PATENT DOCUMENTS

| | | | | |
|---|---|---|---|---|
| 5,680,322 | A * | 10/1997 | Shinoda | 714/18 |
| 6,782,490 | B2 * | 8/2004 | Maxemchuk et al. | 714/18 |
| 6,880,103 | B2 * | 4/2005 | Kim et al. | 714/18 |
| 7,178,069 | B2 * | 2/2007 | Hashimoto et al. | 714/47.2 |
| 7,457,242 | B2 * | 11/2008 | Beightol et al. | 370/230 |
| 7,590,889 | B1 * | 9/2009 | Maxemchuk et al. | 714/18 |
| 7,626,927 | B2 * | 12/2009 | Putzolu et al. | 370/229 |
| 7,644,307 | B2 * | 1/2010 | Musoll | 714/18 |
| 7,680,129 | B2 * | 3/2010 | Fuente et al. | 370/395.52 |
| 7,889,667 | B2 * | 2/2011 | Boyd et al. | 370/242 |
| 2002/0056055 | A1 * | 5/2002 | Kim et al. | 714/18 |
| 2008/0212582 | A1 * | 9/2008 | Zwart et al. | 370/390 |

FOREIGN PATENT DOCUMENTS

| | | |
|---|---|---|
| JP | 09-162917 | 6/1997 |
| JP | 2001-167069 | 6/2001 |
| JP | 2002-368786 | 12/2002 |
| JP | 2004-538548 | 12/2004 |
| WO | 02/084509 | 10/2002 |

* cited by examiner

*Primary Examiner* — Amine Riad
(74) *Attorney, Agent, or Firm* — Staas & Halsey LLP

(57) ABSTRACT

A system module includes a plurality of processors, and a system controller that is connected to the processors via a first transmission line and relays a packet from each of the processors to another system module via a second transmission line in a multiprocessor system. The system controller includes a data transmission controller that, when part of packets constituting a series of data is not received normally from a processor due to a fault in the processor or the first transmission line, generates a supplement packet for a packet that has not been received normally and outputs the supplement packet to the second transmission line.

6 Claims, 13 Drawing Sheets

FIG.7

| TAG | PACKET TYPE |
| --- | --- |
| 01 | HEADER INFORMATION |
| 10 | NORMAL DATA |
| 11 | ERROR DATA |

NORMAL DATA

DATA INCLUDING ERROR
(DISTINGUISHED BY TAG=11)

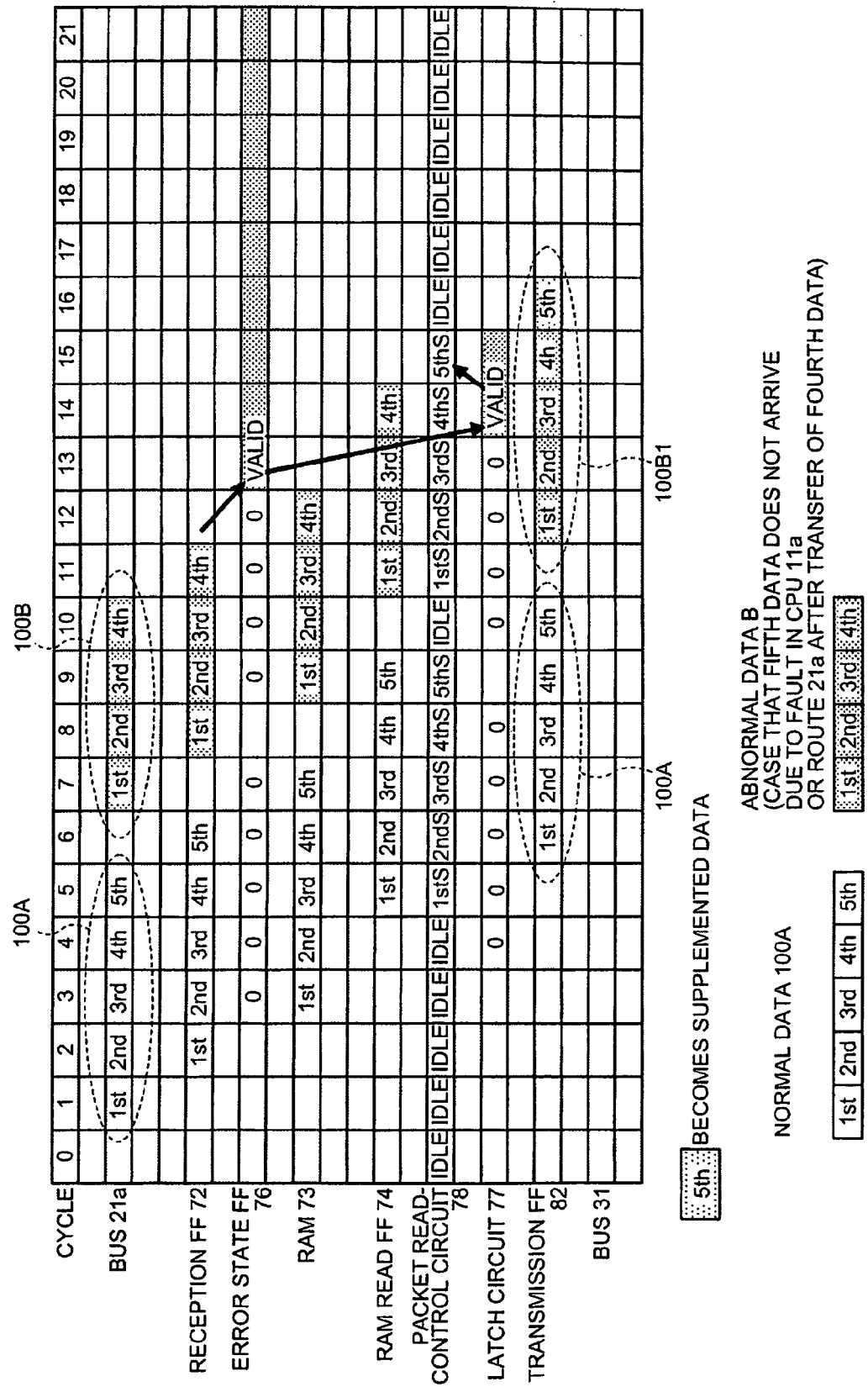

SYSTEM MODULE AND DATA RELAY METHOD

This application is a continuing application, filed under 35 U.S.C. §111(a), of International Application PCT/JP2006/302475, filed Feb. 13, 2006.

BACKGROUND OF THE INVENTION

1. Field of the Invention

The present invention relates to a system module and a data relay method in the system module.

2. Description of the Related Art

There has been proposed a multiprocessor system in which system modules including a plurality of processors are connected with each other by a bus. For example, Japanese Patent Application Laid-open No. 2001-167069 discloses such a system. FIG. 1 is a block diagram of an example of a multiprocessor system. In this example, two system modules 10a and 10b including a multiprocessor are connected with each other via a bus 31. The two system modules have the same configuration, and includes two central processing units (CPU) 11 including a cache memory, respectively, a main memory 12 including a dual inline memory module (DIMM) or the like, a memory access controller (MAC) 13 that controls an access signal to the main memory 12 and the like, and a system controller 14 that relays a packet when a data packet is transmitted over a plurality of system modules 10a and 10b. The system controller 14, the CPU 11, and the MAC 13 are connected with each other via a bus 21.

Described below is a conventional data packet transmission method between the system modules 10a and 10b in the multiprocessor system. Data from a processor such as the CPU 11 or the MAC 13 in a certain system module 10 to the MAC 13 or the CPU 11 in another system module 10 is packetized, and transmitted to the system controller 14. Upon receipt of the packet, the system controller 14 obtains a priority (right of use) for the bus 31 for transmitting the packet to the system module 10 at a destination, and upon receipt of the packet received from the processor, transmits the packet to the system module 10 at the destination. On the other hand, when having received the packet, the system controller 14 in the system module 10 at the destination transmits the packet to the processor at the destination based on destination information of the packet. When transmission of all data (packets) has finished, the bus 31 is released.

In such a data packet transmission method, for example, when a fault occurs in a CPU 11a or a bus 21a during packet transmission from the CPU 11a in the system module 10a to a system controller 14a, and the system controller 14a cannot receive the packet from the CPU 11a to the end normally, the system controller 14a cannot transmit the packet from the CPU 11a onto the bus 31 connecting between the system controllers 14a and 14b indefinitely. Therefore, transmission of the packet from the system controller 14a to the system controller 14b is interrupted. On the side of the system controller 14a, because packet transmission from the CPU 11a cannot be completed, the bus 31 with respect to the system controller 14b cannot be released. As a result, transmission of a data packet having no direct relation with the fault part, such as in a route from a CPU 11b in the system module 10a to the system controller 14a, to the system controller 14b in the system module 10b, and to a CPU 11c, cannot be performed. That is, blocking of the bus 31 connecting between the system controllers 14a and 14b occurs due to the fault in the CPU 11a or the bus 21a between the CPU 11a and the system controller 14a, thereby making the packet transmission impossible in the entire system.

To avoid such blocking of the bus 31, there is a method in which when the system controller 14a detects an error during transmission of the packet from the CPU 11a, transmission of the packet from the system controller 14a to the system controller 14b is discontinued. That is, when an error is detected during transmission of the packet from a certain CPU 11, transmission of the packet from the CPU 11 is discontinued, and a first packet of different data transmitted from another CPU 11 to the system controller 14 is transmitted after the packet, whose transmission has been discontinued as an abnormal packet.

FIG. 2 is a timing chart when the data packet is transmitted between the system controllers by using this method. The timing chart depicts a status where (1) a normal transmission process of first data 100A from the CPU 11a in the system module 10a to the system module 10b, (2) an abnormal transmission process of second data 100B from the CPU 11a in the system module 10a to the system module 10b, and (3) a normal transmission process of third data 100C from the CPU 11b in the system module 10a to the system module 10b are performed continuously. In the timing chart, latency in the system controller 14 is set to 5τ (cycles).

First, a case (1) that the first data 100A is transmitted from the CPU 11a in the system module 10a to the system module 10b is explained. In this case, it is assumed that the first data 100A transmitted from the CPU 11a to the system module 10b is divided into five packets and transmitted. At time [1], a first packet of the first data 100A is transmitted from the CPU 11a to the bus 21a, and the last fifth packet is transmitted to the bus 21a at time [5]. Because the latency in the system controller 14 is 5τ, the first packet is transmitted to the bus 31 connecting the system controllers 14a and 14b at time [6], and the last fifth packet is transmitted to the bus 31 at time [10].

A case (2) that the second data 100B is transmitted from the CPU 11a in the system module 10a to the system module 10b is explained next. Also in this case, it is assumed that the second data 100B transmitted from the CPU 11a to the system module 10b is divided into five packets and transmitted. At time [7], a first packet of the second data 100B is transmitted from the CPU 11a to the bus 21a, and the fourth packet is transmitted to the bus 21a at time [10]. Thereafter, it is assumed that the fifth packet has not reached the system controller 14a due to a fault in the CPU 11a or the bus 21a. At this time, the first packet is transmitted to the bus connecting between the system controllers 14a and 14b at time [12], and the fourth packet is transmitted to the bus 31 at time [15].

A case (3) that the third data 100C is transmitted from the CPU 11b in the system module 10a to the system module 10b is explained. Also in this case, it is assumed that the third data 100C transmitted from the CPU 11b to the system module 10b is divided into five packets and transmitted. At time [8], a first packet of the third data 100C is transmitted from the CPU 11b to a bus 21b connecting between the CPU 11b and the system controller 14a, and the fifth packet is transmitted to the bus 21b at time [12]. The system controller 14a receives the packet from the CPU 11b; however, at the time of reception, the bus connecting between the system controllers 14a and 14b is used for data transmission from the CPU 11a to the system module 10b in (2), and therefore the received packet is temporarily stored in a buffer.

After the system controller 14a has received the fourth packet of the second data 100B, the fifth packet does not arrive, for example, at an expected timing. Therefore, the system controller 14a determines that a fault has occurred in the CPU 11a or the bus 21a connecting the CPU 11a and the system controller 14a, and discontinues the data transmission from the CPU 11a. At time [16], the system controller 14a starts to transmit the first packet of the third data 100C to the bus 31, and at time [20], transmits the fifth packet to the bus 31. Data transmission between the system modules 10a and 10b is performed in this manner.

In such a method of discontinuing the data transmission, however, on the side of the system controller 14b, an abnormal packet from the CPU 11a and a normal packet from the CPU 11b are received continuously. More specifically, all the packets from the CPU 11a are not delivered, and a packet from the CPU 11b is delivered, and therefore the packet is received in an abnormal protocol. That is, on the side of the system controller 14b, there is a fault between the system controllers 14a and 14b. As a result, even in this case, the fault in the CPU 11a or the transmission line (the bus 21a) between the CPU 11a and the system controller 14a affects the entire system.

Further, the system including a plurality of CPUs 11 as shown in FIG. 1 can be used in a state where the system is logically divided for each CPU 11 by partitioning or the like. In such a case, it is not desirable from a viewpoint of system reliability that the bus commonly used by the CPUs is blocked due to a fault in the CPU 11a or errors occur in a chain reaction.

A reliable method for solving the above problems in the conventional technology is that a chip for relaying, such as the system controller 14, discards data having an abnormal packet, after having received the data packets from each processor in the system module 10 to the end, and transmits the data having only the normal packets to the chip (the system controller 14) on the next path.

FIG. 3 is an example of a timing chart when the transmission process of the packet to the system module is performed after all the packets from the processor have been received. It is also assumed in the timing chart that processes of (1) to (3) are performed as in FIG. 2. In the timing chart, the latency in the system controller 14 is set to 5τ (cycles).

First, the case (1) that the first data 100A is transmitted from the CPU 11a in the system module 10a to the system module 10b is explained. In this case, it is assumed that the first data 100A transmitted from the CPU 11a to the system module 10b is divided into five packets and transmitted. At time [1], a first packet of the first data 100A is transmitted from the CPU 11a to the bus 21a, and the last fifth packet is transmitted to the bus 21a at time [5]. In this transmission method, because the system controller 14a transmits only data including normal packets after having received all the packets constituting the data, and the latency in the system controller 14 is 5τ, after having received the fifth packet normally, transmission of the first packet is started and the first packet is transmitted to the bus 31 connecting the system controllers 14a and 14b at time [10], and the last fifth packet is transmitted to the bus 31 at time [14].

The case (2) that the second data 100B is transmitted from the CPU 11a in the system module 10a to the system module 10b is explained next. Also in this case, it is assumed that the second data 100B transmitted from the CPU 11a to the system module 10b is divided into five packets and transmitted. At time [7], a first packet of the second data 100B is transmitted from the CPU 11a to the bus 21a, and the fourth packet is transmitted to the bus 21a at time [10]. Thereafter, it is assumed that the fifth packet has not reached the system controller 14a due to a fault in the CPU 11a or the bus 21a connecting between the CPU 11a and the system controller 14a. At this time, after the system controller 14a has received the fourth packet of the second data 100B, the fifth packet does not arrive within an expected timing. Therefore, the system controller 14a determines that there is an error, and discards the first to fourth packets received as the abnormal second data 100B. Accordingly, the second packet is not transmitted to the bus 31 connecting between the system controllers 14a and 14b.

The case (3) that the third data 100C is transmitted from the CPU 11b in the system module 10a to the system module 10b is explained. Also in this case, it is assumed that the third data 100C transmitted from the CPU 11b to the system module 10b is divided into five packets and transmitted. At time [8], a first packet of the third data 100C is transmitted from the CPU 11b to the bus 21b connecting between the CPU 11b and the system controller 14a, and the fifth packet is transmitted to the bus 21b at time [12]. The system controller 14a receives the first to fifth packets from the CPU 11b normally. After having received the last fifth packet, the transmission process of the third data 100C is started, and at time [17], the third data 100C is transmitted to the bus 31 connecting the system controllers 14a and 14b, and the last fifth packet is transmitted to the bus 31 at time [21].

This method is desired from viewpoint of reliability; however, the latency in the packet transfer increases because after all the packets have been received, the packets need to be transmitted to another chip (the system controller 14). That is, when there is no error in the CPU 11 and the bus 21 connecting between the CPU 11 and the system controller 14, as the size of data to be transmitted increases, the latency increases because the system controller 14 needs to wait for arrival of all the data.

SUMMARY

It is an object of the present invention to at least partially solve the problems in the conventional technology.

According to an aspect of the present invention, there is provides a system module includes a plurality of processors each including a plurality of central processing units, and a system controller that is connected to the processors via a first transmission line and relays a packet from each of the processors to another system module via a second transmission line. The system controller includes a data transmission controller for each of the processors connected via the first transmission line. When part of packets constituting a series of data transmitted from a processor is not received normally due to a fault in the processor or the first transmission line, the data transmission controller generates a supplement packet for a packet that has not been received normally and outputs the supplement packet to the second transmission line.

According to another aspect of the present invention, there is provides a data relay method applied to a system module that includes a plurality of processors each including a plurality of central processing units, and a system controller connected to the processors via a first transmission line and relays a packet from each of the processors to another system module via a second transmission line. The data relay method includes, in the system controller: generating, when part of packets constituting a series of data transmitted from a processor is not received normally due to a fault in the processor or the first transmission line, a supplement packet for a packet that has not been received normally; and outputting the supplement packet to the second transmission line.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is an example of a tag attached to a packet to be transmitted;

FIG. 14 is a timing chart of a process flow in respective processors performed by the system controller.

DETAILED DESCRIPTION OF THE PREFERRED EMBODIMENTS

Exemplary embodiments of the present invention are explained in detail below with reference to the accompanying drawings.

Figure 1:
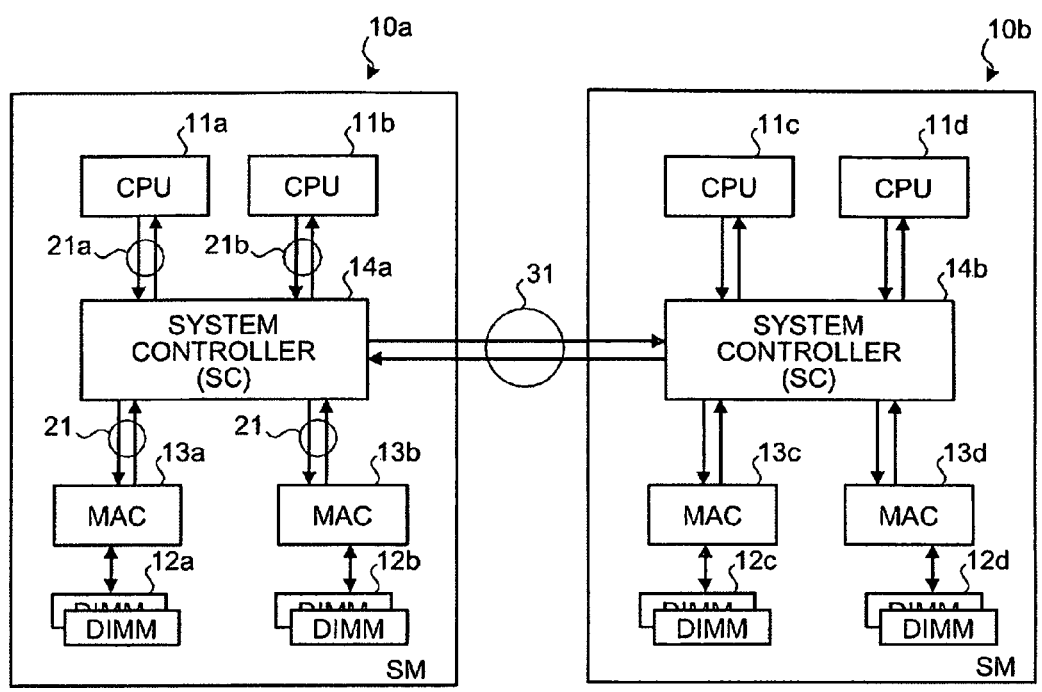
FIG. 1 is a block diagram of an example of a multiprocessor system according to an embodiment of the present invention.
Figure 2:
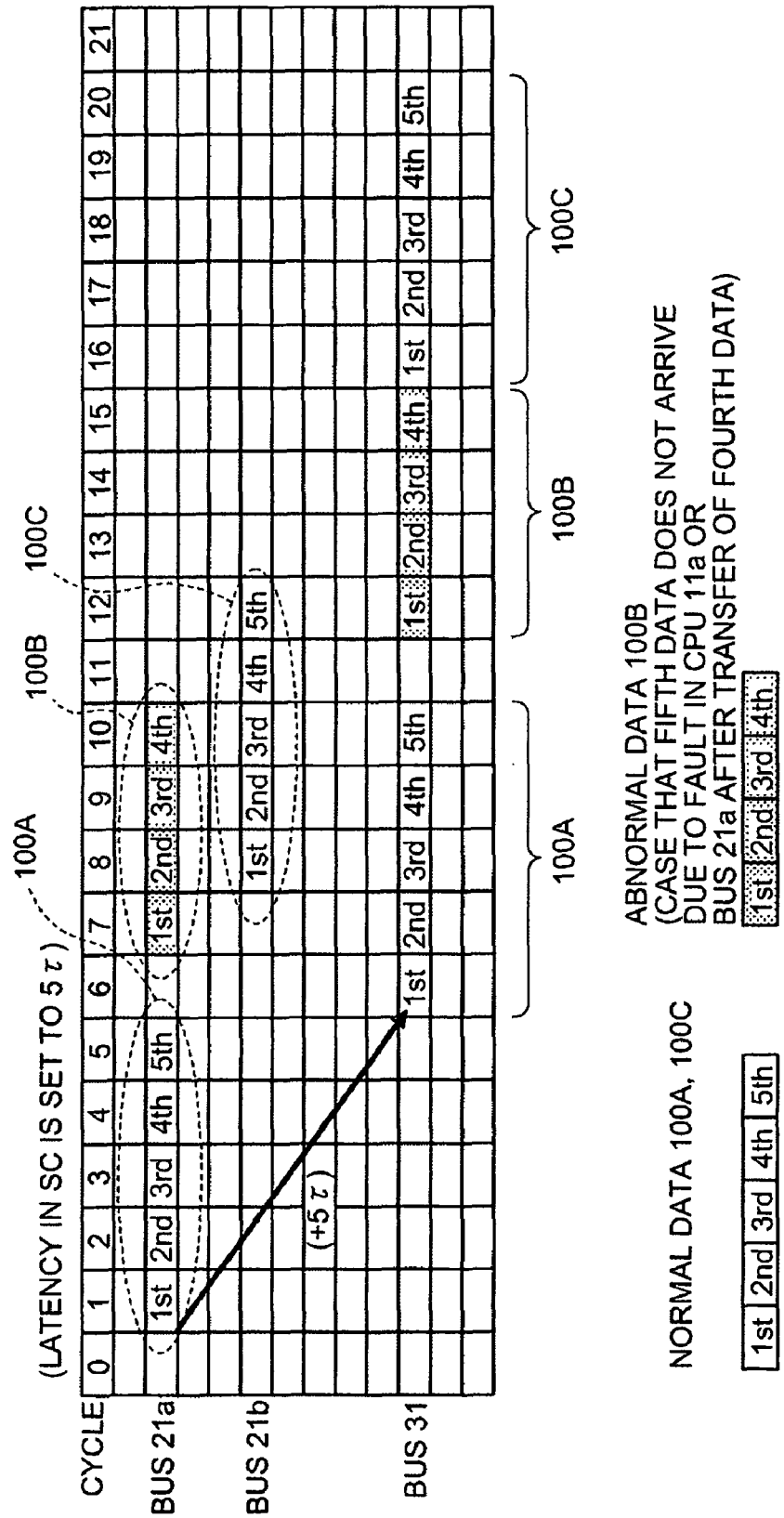
FIGS. 2 and 3 are timing charts of data packet transmission between system controllers in a conventional technology.
Figure 3:
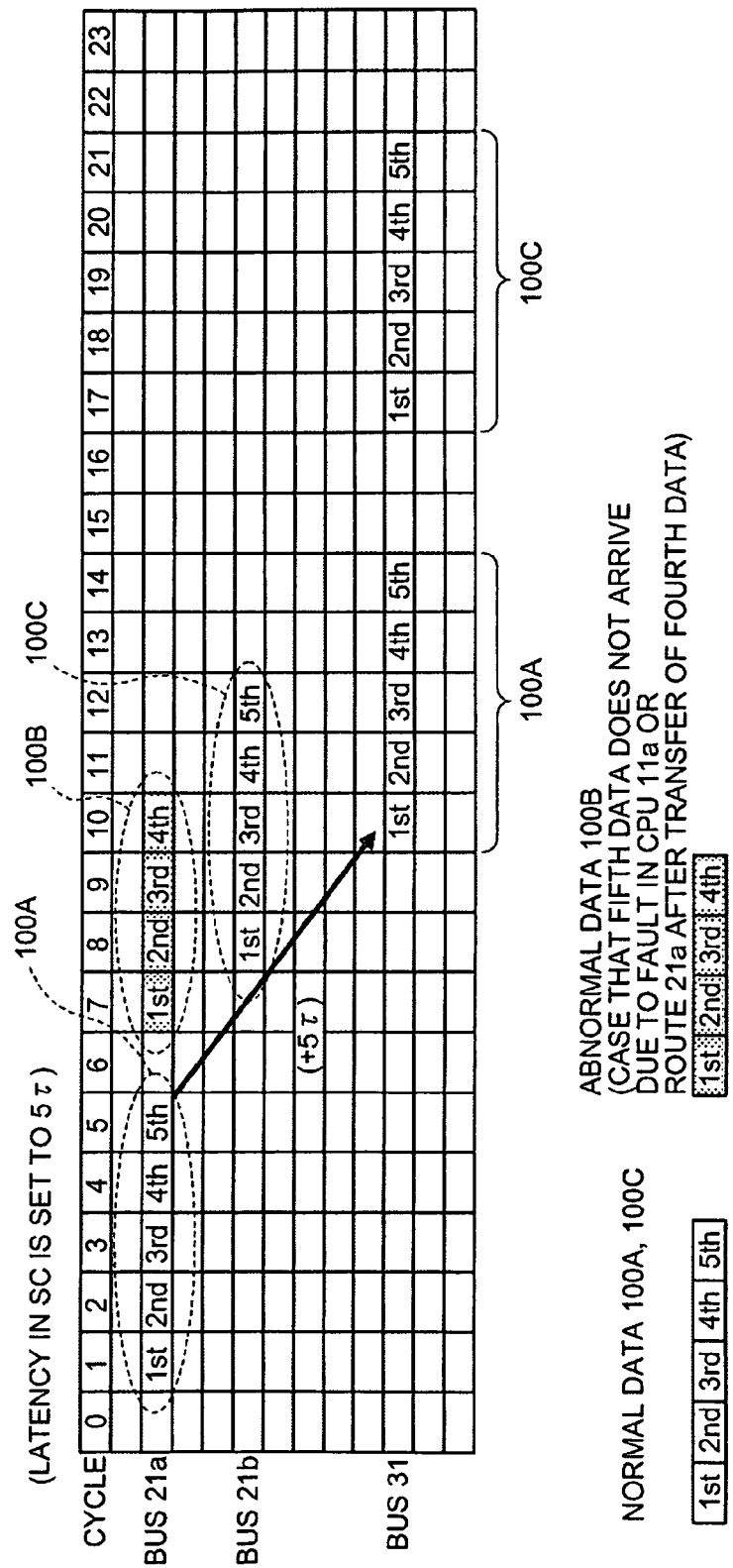

FIG. 1 is a schematic block diagram of a configuration of a multiprocessor system according to an embodiment of the present invention. In the multiprocessor system, system modules 10a and 10b including a multiprocessor are connected with each other via the bus 31. The system module 10a executes a predetermined arithmetic processing based on an input of a predetermined sequence of instruction, and includes two CPUs 11a and 11b including a cache memory, main memories 12a and 12b formed of a DIMM or the like, memory access controllers (MAC) 13a and 13b that control an access signal to the main memories 12a and 12b, and the system controller 14a that relays a packet when the packet is transmitted to the other system module 10b. In the system module 10a, the CPUs 11a and 11b, the MACs 13a and 13b, and the system controller 14a are connected with each other via a bus 21. As shown schematically in FIG. 1, a transmission line that connects the CPU 11a and the system controller 14a is designated as the bus 21a, and a transmission line that connects the CPU 11b and the system controller 14a is designated as the bus 21b. The CPUs 11a and 11b and the MACs 13a and 13b correspond to a processor in the appended claims, the buses 21, 21a, and 21b correspond to a first transmission line, and the bus 31 corresponds to a second transmission line in the claims.

Likewise, the system module 10b includes CPUs 11c and 11d, main memories 12c and 12d, MACs 13c and 13d, and a system controller 14b. The CPUs 11c and 11d, the MACs 13c and 13d, and the system controller 14b are connected with each other via the bus. The CPUs 11c and 11d, and the MACs 13c and 13d correspond to the processor in the claims, and the bus corresponds to a first transmission line in the claims. Respective units are explained below using the reference numerals or letters in the system module 10a.

The system controller 14a has a function of transmitting a received packet to one or more destinations at the time of transmitting the packet across the system modules 10a and 10b, and includes a reception processor that processes a packet received from the system controller 14b in the other system module 10b and a transmission processor that transmits the packet from the processors (the CPUs 11a and 11b, and the MACs 13a and 13b) in the own system module 10a to the other system module 10b. In this embodiment, the system controller 14a includes, in the transmission processor, a data transmission controller that can maintain a usable state of the bus 31 between the system controllers 14a and 14b without stopping the entire system, when an error occurs in the processor or the bus (transmission line) 21 between the processor and the system controller 14a, while the processor in the own system module 10a is transmitting the packet to the other system module 10b, for each processor connected to the system controller. The data transmission controller corresponds to a data transmission control unit in the claims.

Figure 4:
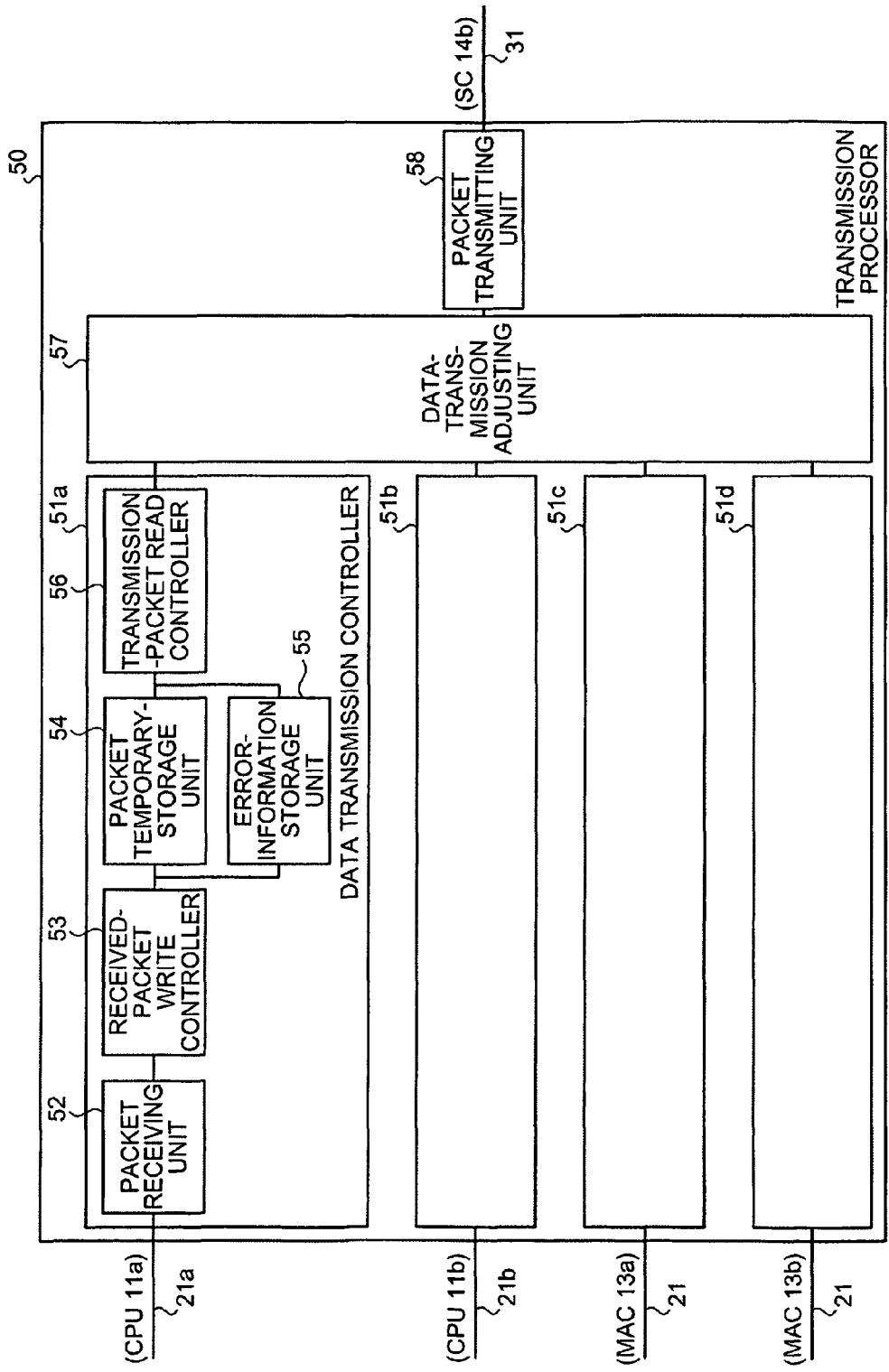
FIG. 4 is a schematic block diagram of a configuration of a transmission processor in the system controller.

FIG. 4 is a schematic block diagram of a configuration of the transmission processor in the system controller. A transmission processor 50 includes data transmission controllers 51a to 51d provided for each processor in the system module 10a connected via the bus 21, a data-transmission adjusting unit 57 that switches the packet to be sent to the bus 31 between the system modules 10a and 10b based on the priority (right of use) of the bus 31 connecting between the system controllers 14a and 14b, and a packet transmitting unit 58 that transmits the packet transmitted from the data-transmission adjusting unit 57 to the target system controller 14b in the system module 10b via the bus 31.

Further, the data transmission controller 51 includes a packet receiving unit 52, a received-packet write controller 53, a packet temporary-storage unit 54, an error-information storage unit 55, and a transmission-packet read controller 56. The transmission processors corresponding to respective processors are of basically the same configuration and function in the same manner, and therefore, the functional configuration of the data transmission controllers 51b to 51d is omitted from FIG. 4. In FIG. 4, the data transmission controller 51a is connected to the CPU 11a, the data transmission controller 51b is connected to the CPU 11b, the data transmission controller 51c is connected to the MAC 13a, and the data transmission controller 51d is connected to the MAC 13b. The received-packet write controller 53 corresponds to a received-packet write control unit in the claims, the packet temporary-storage unit 54 corresponds to a packet temporary-storage unit in the claims, the error-information storage unit 55 corresponds to an error-information storage unit in the claims, and the transmission-packet read controller 56 corresponds to a transmission-packet read control unit in the claims.

The packet receiving unit 52 receives the packet from the processors such as the CPUs 11a and 11b and the MACs 13a and 13b connected to the own system controller 14a in the system module 10a via the buses 21a, 21b, and 21.

The received-packet write controller 53 monitors whether the packet received by the packet receiving unit 52 is a normal packet or an abnormal packet. When the received packet is the normal packet, the received-packet write controller 53 writes the packet to the packet temporary-storage unit 54, and when the received packet is the abnormal packet, the received-packet write controller 53 writes error information indicating that the packet is abnormal to the error-information storage unit 55. The operation of the received-packet write controller 53 is performed immediately after receipt of the packet by the packet receiving unit 52. The determination whether the received packet is normal or abnormal performed by the received-packet write controller 53 is performed based on whether the packet conforms to an agreement on an interface of the system controller 14a. In this embodiment, a case that the received-packet write controller 53 extracts the total number of packets from header information held by a top packet, for one or more packets constituting the data transmitted from the processor, and when the packet from the processor does not arrive within a predetermined time, before receiving the total number of packets, the received-packet write controller 53 detects an error is explained as an example. As the cause of such an error, an error (fault) in the processor as a sender of the packet, an error in the bus 21 between the processor and the system controller 14a, and an error in the received-packet write controller 53 itself can be mentioned.

The packet temporary-storage unit 54 stores the normal packet received by the packet receiving unit 52. The error-information storage unit 55 stores the error information indicating that the packet determined as a reception failure by the received-packet write controller 53 has the reception failure.

The transmission-packet read controller 56 refers to the error-information storage unit 55 to read the packet to be transmitted from the packet temporary-storage unit 54, or supplements an error packet (hereinafter, "supplement packet") indicating that the packet has an error, for which the error information is stored in the error-information storage unit 55, to output the error packet to the packet transmitting unit 58. For example, when the packet, which should be present, has not reached the system controller 14a actually, the transmission-packet read controller 56 supplements the supplement packet including the error information instead of the packet and transmits the supplement packet to the packet transmitting unit 58. The transmission-packet read controller 56 performs the transmission process, upon storage of the packet in the packet temporary-storage unit 54.

The data-transmission adjusting unit 57 has a function of performing a switching process to send the packet from the data transmission controllers 51a to 51d provided for each processor connected to the system controller 14a via the bus 21 based on the right of use of the bus 31 connecting the system modules 10a and 10b, to thereby flow the packet to the packet transmitting unit 58. The packet transmitting unit 58 has a function of transmitting the packet transmitted from the data-transmission adjusting unit 57 to the bus 31 connecting the system modules 10a and 10b.

Figure 5:
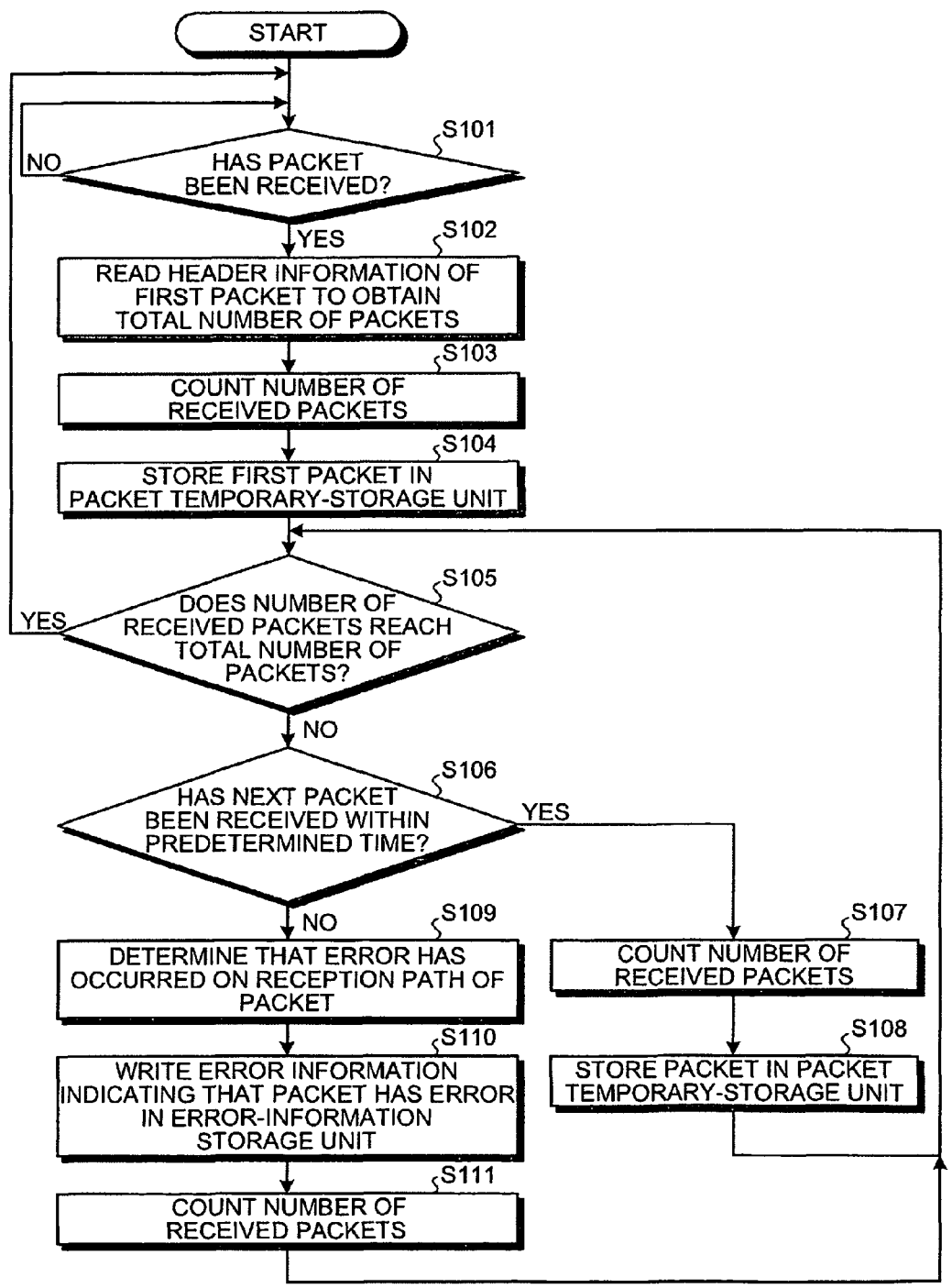
FIG. 5 is a flowchart of an example of a received-packet write process performed by a received-packet write controller in a data transmission controller shown in FIG. 4.

The transmission processing of the system controller 14a having such a configuration is explained next. FIG. 5 is a flowchart of a received-packet write process performed by the received-packet write controller in the data transmission controller. It is assumed that the data transmitted from the processor connected to the data transmission controller 51 is divided into first to nth packets (n: a natural number) and transmitted. The first packet is handled, assuming that it has no error.

First, the data transmission controller 51 connected to the predetermined processor enters a wait state when it is in such a state that the packet from the processor is not received by the packet receiving unit 52 (NO at step S101). On the other hand, when the packet is received by the packet receiving unit 52 (YES at step S101), the received-packet write controller 53 reads the packet received from the packet receiving unit 52, i.e., header information of the first packet, to thereby obtain the total number n of packets to be transmitted from the processor (step S102), and counts the number of the received packets (step S103). The received-packet write controller 53 then writes the first packet to the packet temporary-storage unit 54 (step S104).

The received-packet write controller 53 then determines whether the number of the received packets reaches the total number n of packets (step S105). When the number of the received packets reaches the total number n of packets (YES at step S105), the process control returns to step S101 to wait to receive the next packet constituting new data. On the other hand, when the number of the received packets does not reach the total number n of packets (NO at step S105), the received-packet write controller 53 determines whether the next packet has been received within a predetermined time after receipt of the previous packet (step S106).

When the next packet has been received within the predetermined time (YES at step S106), the received-packet write controller 53 counts the number of the received packets (step S107) and writes and stores the packets in the packet temporary-storage unit 54 (step S108). The process control returns to step S105 to repeat the process.

On the other hand, when the next packet has not been received within the predetermined time (No at step S106), the received-packet write controller 53 determines that an error has occurred in the processor that has transmitted the packet, in the bus 21 between the processor and the system controller, or in the received-packet write controller 53 itself, i.e., on a reception path of the packet (step S109), and writes the error information indicating that the packet with that number has an error to the error-information storage unit 55 (step S110). The received-packet write controller 53 then counts the number of received packets including the error packet as a processed packet (step S111). The process control returns to step S105 to repeat the process. The received-packet write controller 53 performs the received-packet write process in this manner.

In the explanations of the received-packet write process, it is determined whether the received packet is normal or abnormal for each received packet to count the number of packets until the count reaches the total number of packets. However, if any one of the received packets is abnormal, the data including the packet cannot be used on the reception side. Therefore, when it is determined that a packet is abnormal, the subsequent packet reception process may not be performed, and all the packets thereafter can be processed as abnormal packets.

Figure 6:
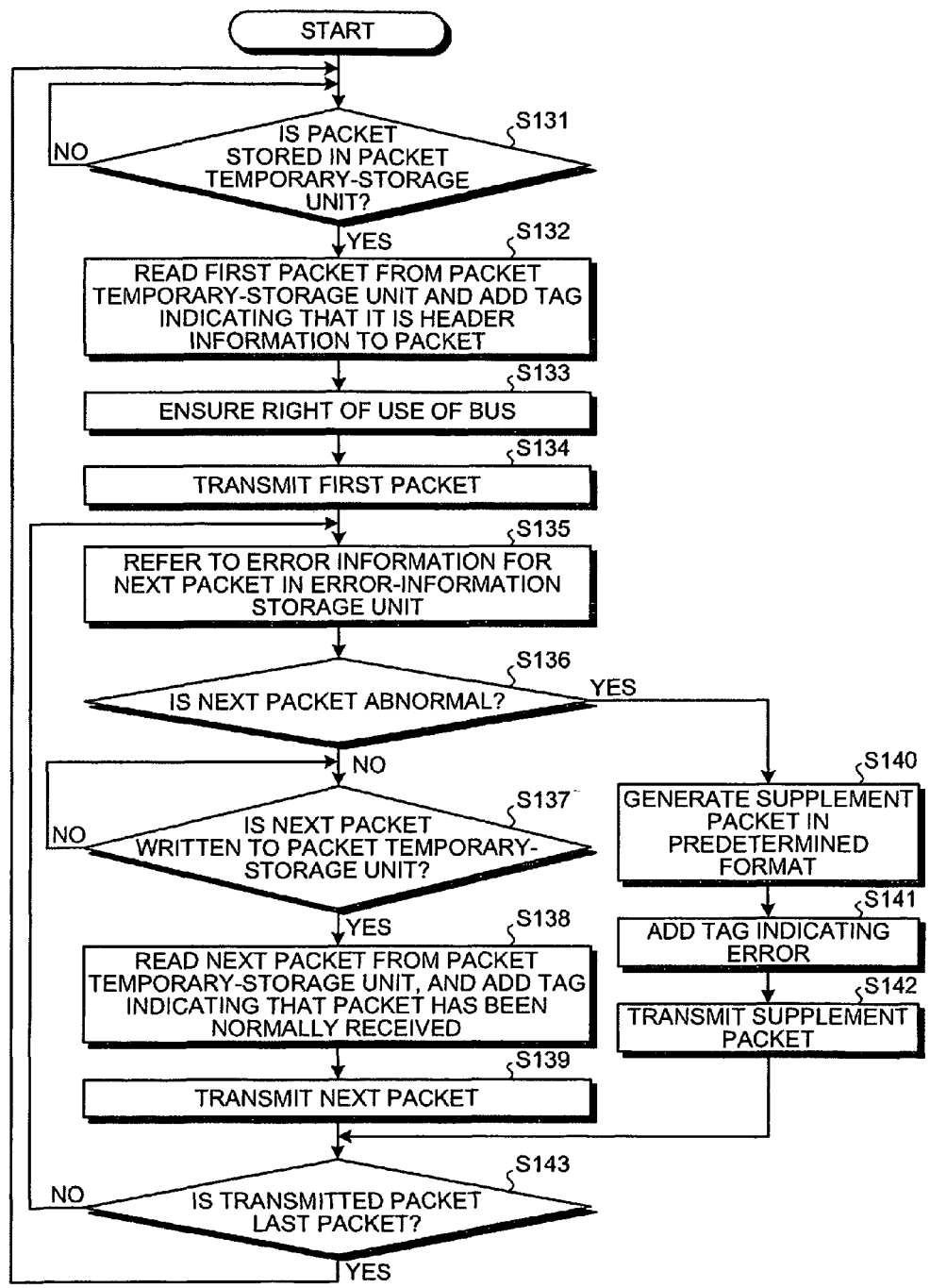
FIG. 6 is a flowchart of an example of a transmission-packet read process performed by a transmission-packet read controller in the data transmission controller.

FIG. 6 is a flowchart of a transmission-packet read process performed by the transmission-packet read controller in the data transmission controller. It is assumed herein that the data is divided into first to nth packets (n: a natural number) and transmitted as previously described in connection with FIG. 5. The first packet is handled, assuming that it has no error.

First, when a packet from the processor connected to the data transmission controller 51 is not received and is not stored in the packet temporary-storage unit 54 (NO at step S131), the transmission-packet read controller 56 enters the wait state. On the other hand, when the packet is temporarily stored in the packet temporary-storage unit 54 (YES at step S131), the transmission-packet read controller 56 reads the first packet received from the processor from the packet temporary-storage unit 54 and adds a tag indicating that it is the header information to the packet (step S132).

Figure 8A:
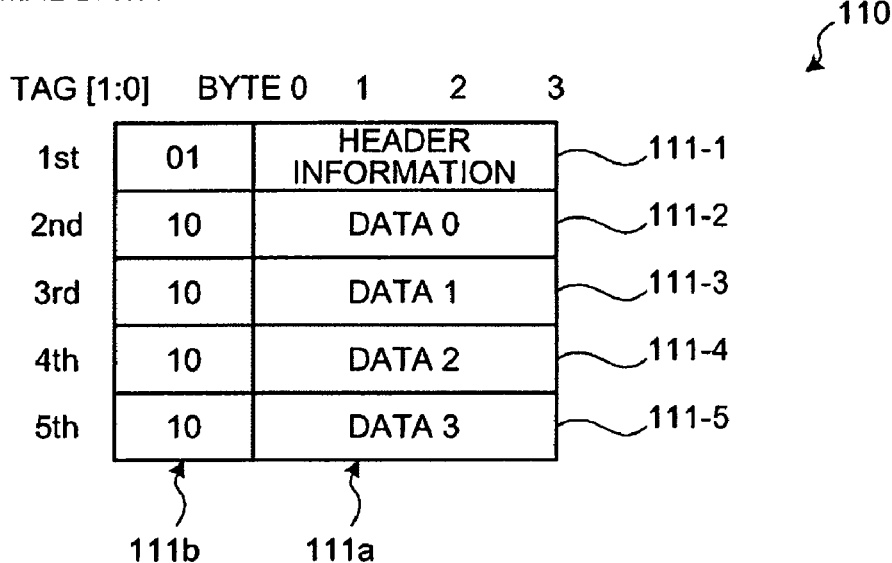
FIG. 8A is an example of normal data formed of packets each attached with a tag.
Figure 8B:
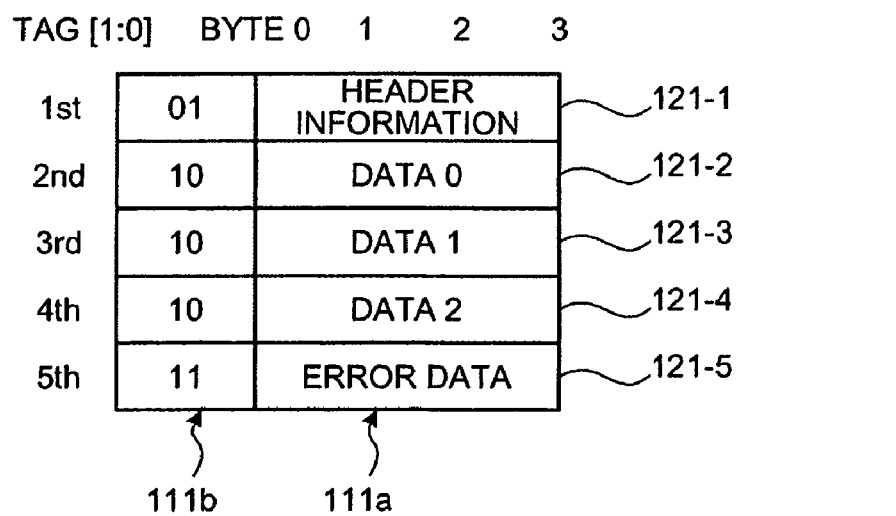
FIG. 8B is an example of abnormal data formed of packets each attached with a tag including an abnormal packet.

FIG. 7 is an example of the tag attached to the packet to be transmitted. FIG. 8A is an example in which the tag is attached to the normal packet. FIG. 8B is an example in which the tag is attached to the abnormal packet. In the example, a 2-bit tag (packet abnormal state display information) is attached to a packet correspondingly to the type of the packet. For example, a tag "01" indicates that the content of the packet is the header information including the number of packets for the data including the packet, a tag "10" indicates that the packet is received normally by the packet receiving unit 52, and a tag "11" indicates that the packet is not received normally by the packet receiving unit 52, i.e., the packet is a supplement packet. Such supplemented packet is issued to supplement a packet that has not been received due to a fault in the processor connected to the data transmission controller 51, in the bus 21 between the processor and the system controller, or in the received-packet write controller 53. As shown in FIGS. 8A and 8B, because the first packets 111-1 and 121-1 are header information, "01" is attached to the top of a packet 111*a* read from the packet temporary-storage unit 54 as a tag 111*b*.

The transmission-packet read controller 56 ensures the right of use of the bus 31 connecting between the system controllers 14*a* and 14*b* at the destination to transmit the read packet (step S133). Thereafter, the transmission-packet read controller 56 transmits the first packet to the data-transmission adjusting unit 57 (step S134).

The transmission-packet read controller 56 then refers to the error information in the error-information storage unit 55 (step S135) to determine whether the next packet is abnormal based on the error information (step S136). When the next packet is not abnormal (NO at step S136), the transmission-packet read controller 56 determines whether the next packet is written to the packet temporary-storage unit 54 (step S137). When the next packet is not written to the packet temporary-storage unit 54 (NO at step S137), the transmission-packet read controller 56 enters the wait state. When the next packet is written to the packet temporary-storage unit 54 (YES at step S137), the transmission-packet read controller 56 reads the next packet from the packet temporary-storage unit 54, and adds a tag indicating that the packet has been received normally (step S138). In this case, because the packet is normal, "10" is added to the head of the packet read from the packet temporary-storage unit 54 as the tag 111*b*, like the second to fifth packets 111-2 to 111-5 in FIG. 8A and the second to fourth packets 121-2 to 121-4 in FIG. 8B. Thereafter, the packet added with the tag is transmitted to the data-transmission adjusting unit 57 (step S139).

When the error information of the next packet indicates an error at step S136 (YES at step S136), the transmission-packet read controller 56 generates the supplement packet indicating an error in a predetermined format (step S140), and adds a tag indicating that the packet is an error packet to the generated supplement packet (step S141). In this case, because the packet is the supplement packet, "11" is added to the head of the generated supplement packet 111*a* as the tag 111*b* like the fifth packet 121-5 in FIG. 7 or FIG. 8B. Thereafter, the supplement packet is transmitted to the data-transmission adjusting unit 57 (step S142).

Thereafter or after step S139, the transmission-packet read controller 56 determines whether the packet transmitted at step S139 or S142 is the last packet (step S143). The determination is made based on whether the number of transmitted packets has reached the total number of packets indicated by the header information of the first packet read at step S132. When the transmitted packet is not the last packet (NO at step S143), the process control returns to step S135 to repeat the process. When the transmitted packet is the last packet (YES at step S143), the process control returns to step S131 to enter the wait state until the next packet of new data is stored in the packet temporary-storage unit 54, and the process is repeated. The transmission-packet read controller 56 performs the transmission-packet read process in this manner.

In the explanations of the received-packet write process, it is determined whether the received packet is normal or abnormal for each received packet to count the number of packets, until the count reaches the total number of packets. However, if any one of the received packets is abnormal, the data including the packet cannot be used on the reception side. Therefore, when it is first determined that the packet is abnormal, the subsequent reception process of the packet may not be performed, and all the packets thereafter can be processed as abnormal packets.

Even when the packet to be received from the processor in the system module 10*a* is not received, the packet to be received is supplemented and the supplement packet including the error information is transmitted to the other system module 10*b*. Therefore, the packet transmission process from the processor can be normally finished in view of a protocol between the system modules 10*a* and 10*b*.

Figure 9:
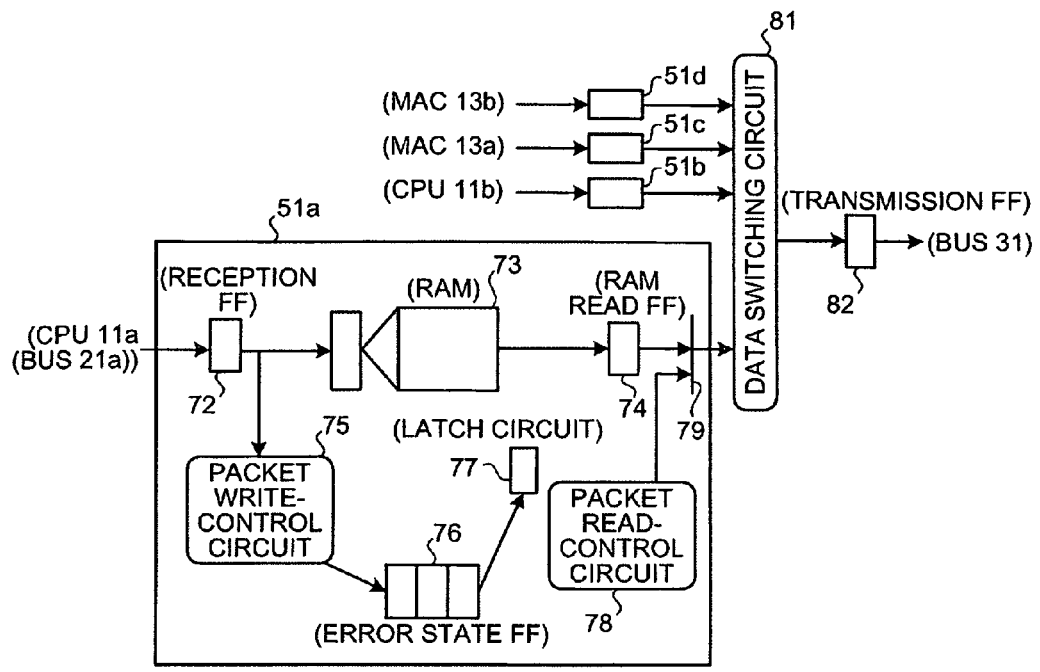
FIG. 9 is a block diagram of an example of a circuit configuration of the transmission processor in the system controller.

The system controller having such a functional configuration is explained below with a more specific example. FIG. 9 is a block diagram of an example of a circuit configuration of the transmission processor in the system controller shown in FIG. 4. The transmission processor includes the data transmission controllers 51*a* to 51*d* that are present corresponding to the respective processors, a data switching circuit 81 that switches the packet transmitted from the respective data transmission controllers 51*a* to 51*d*, and a transmission flip-flop circuit (hereinafter, "transmission FF") 82 that transmits the packet. The data switching circuit 81 corresponds to the data-transmission adjusting unit 57 in FIG. 4, and the transmission FF 82 corresponds to the packet transmitting unit 58 in FIG. 4.

The respective data transmission controllers 51*a* to 51*d* include a reception flip-flop circuit (hereinafter, "reception FF") 72 that receive the packet from the corresponding processor, a random access memory (RAM) 73 in which the content of the received packet is temporarily stored, a RAM read flip-flop circuit (hereinafter, "RAM read FF") 74 that reads the packet stored in the RAM 73, a packet write-control circuit 75 that monitors the presence of abnormality of the received packet to control write to the RAM 73, an error-state storage flip-flop circuit (hereinafter, "error state FF") 76 that stores an error state of the received packet, a latch circuit 77 that indicates the presence of the abnormal state by a flag, synchronized with the packet read from the RAM 73, a packet read-control circuit 78 that refers to the latch circuit 77 to control read of the packet from the RAM 73 by the RAM read FF 74 and in the case of the abnormal packet, generates the supplement packet including the error information to transmit the supplement packet, and a selector 79 that selects either the packet from the RAM read FF 74 or the supplement packet from the packet read-control circuit 78 based on the information of the latch circuit 77.

The reception FF 72 corresponds to the packet receiving unit 52 in FIG. 4, the RAM 73 corresponds to the packet temporary-storage unit 54, the packet write-control circuit 75 corresponds to the received-packet write controller 53, the error state FF 76 and the latch circuit 77 correspond to the error-information storage unit 55, and the RAM read FF 74, the packet read-control circuit 78, and the selector 79 correspond to the transmission-packet read controller 56.

Figure 10:
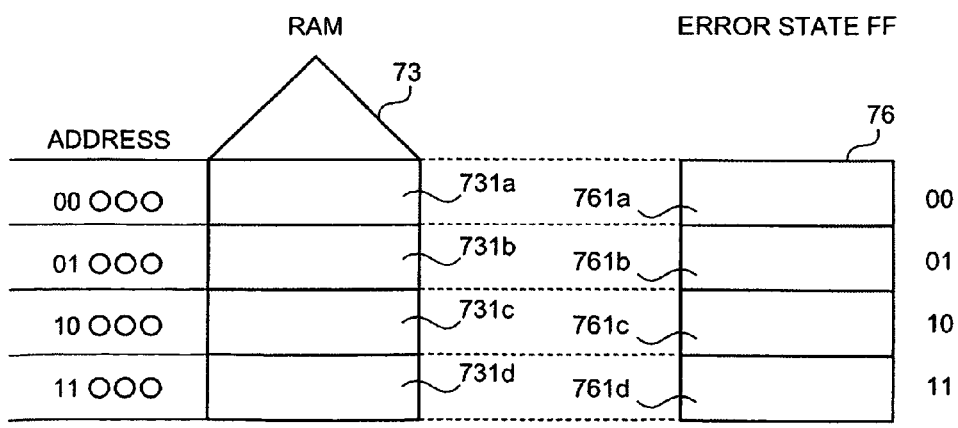
FIG. 10 is a schematic diagram for explaining a correspondence between a storage area in a RAM and an error state FF.

The error state FF 76 stores whether the packet (data) stored in a packet storage area of the RAM 73 is normal in association with the packet storage area of the RAM 73. When the packet is normal, "0" is stored, and when the packet is abnormal, "1" is stored. FIG. 10 schematically depicts the correspondence between the storage area of the RAM and the error state FF. Packet storage areas 731a to 731d for storing the received packet are allocated to the RAM 73 beforehand. An address is added to each of the packet storage areas 731. For example, an address (binary number) of the first packet storage area 731a is expressed as "00OOO", an address of a second packet storage area 731b is expressed as "01OOO", an address of the third packet storage area 731c is expressed as "10OOO", and an address of the fourth packet storage area 731d is expressed as "11OOO". However, "OOO" expresses an arbitrary binary number. The error state FF 76 has a 1-bit storage area 761 corresponding to the packet storage area 731 provided in the RAM 73, with respect to the RAM 73 provided with the packet storage areas 731a to 731d. The packet storage areas 731a to 731d can be identified by two most significant bits of the address. The two most significant bits of the packet storage areas 731a to 731d is used as an identifier, to associate the identifier with respective storage areas 761a to 761d in the error state FF 76. In the example of FIG. 10, "00", "01", "10", and "11" are associated with the higher-order bits (the storage areas 761a to 761d) in order in the error state FF 76.

The latch circuit 77 indicates the presence of the abnormal state of the packet by a flag when the packet read-control circuit 78 reads the packet from the RAM 73. In the example, "0" is stored when the packet is normal, and "1" is stored when the packet is abnormal.

The packet read-control circuit 78 controls the packet to be transmitted based on the flag in the latch circuit 77. Specifically, when the latch circuit 77 indicates "0" at the time of reading the packet from the RAM 73 to the RAM read FF 74, because the latch circuit 77 indicates that the packet to be read is normal, the packet read-control circuit 78 reads the packet from the RAM 73 to the RAM read FF 74. On the other hand, when the latch circuit 77 indicates "1" at the time of reading the packet from the RAM 73 to the RAM read FF 74, because the latch circuit 77 indicates that the packet to be read is abnormal (there is no packet), the packet read-control circuit 78 generates the supplement packet that supplements the packet, which should be present, having a content indicating an error. When the first packet of certain data from the RAM 73 is read, the packet read-control circuit 78 performs a process for ensuring the right of use of the bus 31 to be connected to the system module 10b at the destination.

The RAM read FF 74 temporarily stores the packet read by the packet read-control circuit 78. The selector 79 refers to the error information of the latch circuit 77, to select either the packet from the RAM read FF 74 or the supplement packet from the packet read-control circuit 78 to transmit the packet to the data switching circuit 81.

Because other constituent elements basically have the same functions as those of the corresponding constituent elements explained in FIG. 4, explanations thereof will be omitted.

A specific operation process of the packet transmission processor is explained next with an example in which one data is divided into first to fifth packets and transmitted from the CPU 11a in the system module 10a to the MAC 13c in the other system module 10b.

Figure 11:
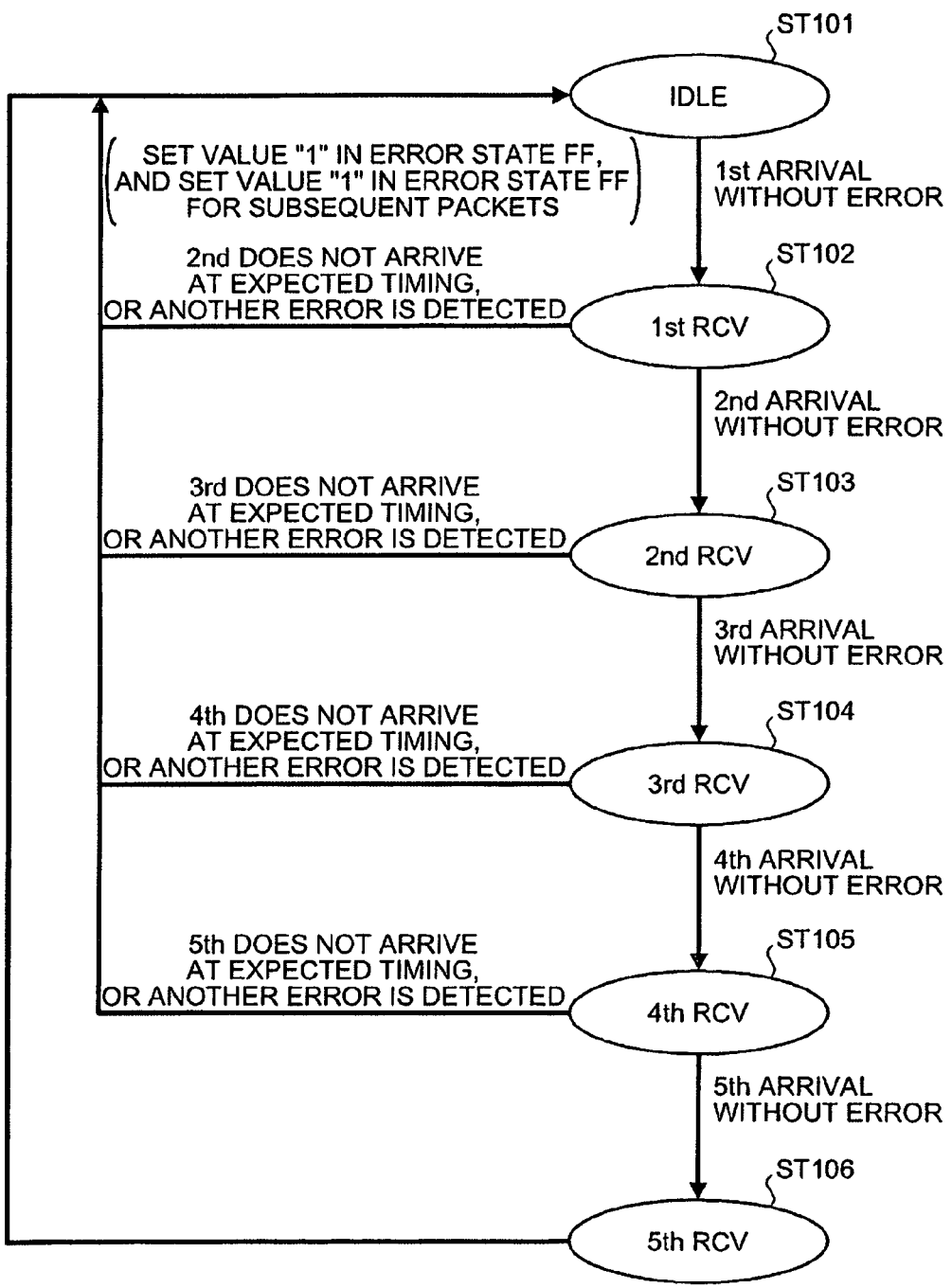
FIG. 11 is a schematic diagram for explaining a state transition of a packet write-control circuit.

Described below is a process performed on the received packet by the packet write-control circuit 75. FIG. 11 depicts a state transition of the packet write-control circuit. As shown in the FIG. 11, when the data from the CPU 11a to the other system module 10b is not received, the packet write-control circuit is in an idle state (expressed as IDLE in FIG. 11) (ST101). Thereafter, when the first packet arrives at the reception FF 72 normally, the packet write-control circuit 75 enters a first packet receiving state, i.e., 1st RCV in FIG. 11 (ST102). The packet write-control circuit 75 extracts the total number of a series of packets (total number of packets) from the header information of the first packet. The packet write-control circuit 75 then writes the first packet to the RAM, and error information "0" indicating that the packet is normal is stored in the storage area of the error state FF 76 corresponding to the written packet storage area of the RAM.

When the second packet arrives at the reception FF 72 normally (without an error) at an expected timing after receipt of the first packet, in the first packet receiving state, the packet write-control circuit 75 enters a second packet receiving state, i.e., 2nd RCV in FIG. 11 (ST103). The packet write-control circuit writes the second packet to the RAM 73, and error information "0" indicating that the packet is normal is stored in the storage area 761 of the error state FF 76 corresponding to the written packet storage area 731 of the RAM. However, in the idle state (initial state), when it is assumed that the storage area 761 of the error state FF 76 is in a reset state, the write process for writing the error information to the storage area 761 is not performed actually.

Thereafter, when the third to fifth packets arrive at the reception FF 72 normally (without an error) at an expected timing after receipt of the previous packet, the packet write-control circuit 75 enters the same state to perform the same process (ST103 to ST106). However, after receipt of the last packet of the series of packets, in this example, after the fifth packet receiving state, i.e., 5th RCV in FIG. 11, where the fifth packet has been received, the packet write-control circuit 75 enters the idle state at ST101.

On the other hand, when the second packet does not arrive at the reception FF 72 at an expected timing (within a predetermined time) after receipt of the first packet in the first packet receiving state (ST102) or another error has been detected, the packet write-control circuit 75 sets "1" indicating an error to the storage area of the error state FF 76 corresponding to the second packet, and writes "1" indicating an error to the storage area of the error state FF 76 corresponding to the subsequent packets (here, the third to fifth packets), and enters the idle state at ST101.

Also in the second to fourth packet receiving states (ST103 to ST105), when any of the third to fifth packets does not arrive at the reception FF 72 at an expected timing (within a predetermined time) after receipt of the previous packet or another error has been detected, the packet write-control circuit 75 sets "1" indicating an error to the storage area of the error state FF 76 corresponding to the packet, and writes "1" indicating an error to the storage area of the error state FF 76 corresponding to the subsequent packet, and enters the idle state at ST101. In the example in FIG. 11, when the packet write-control circuit 75 detects the error, "1" indicating an error is written to the error state FF 76 also for the subsequent packets. However, having once detected "1" indicating an error, the latch circuit 77 in the packet read-control circuit 78 can be operated to hold "1" until completion of the data transmission.

Figure 12:
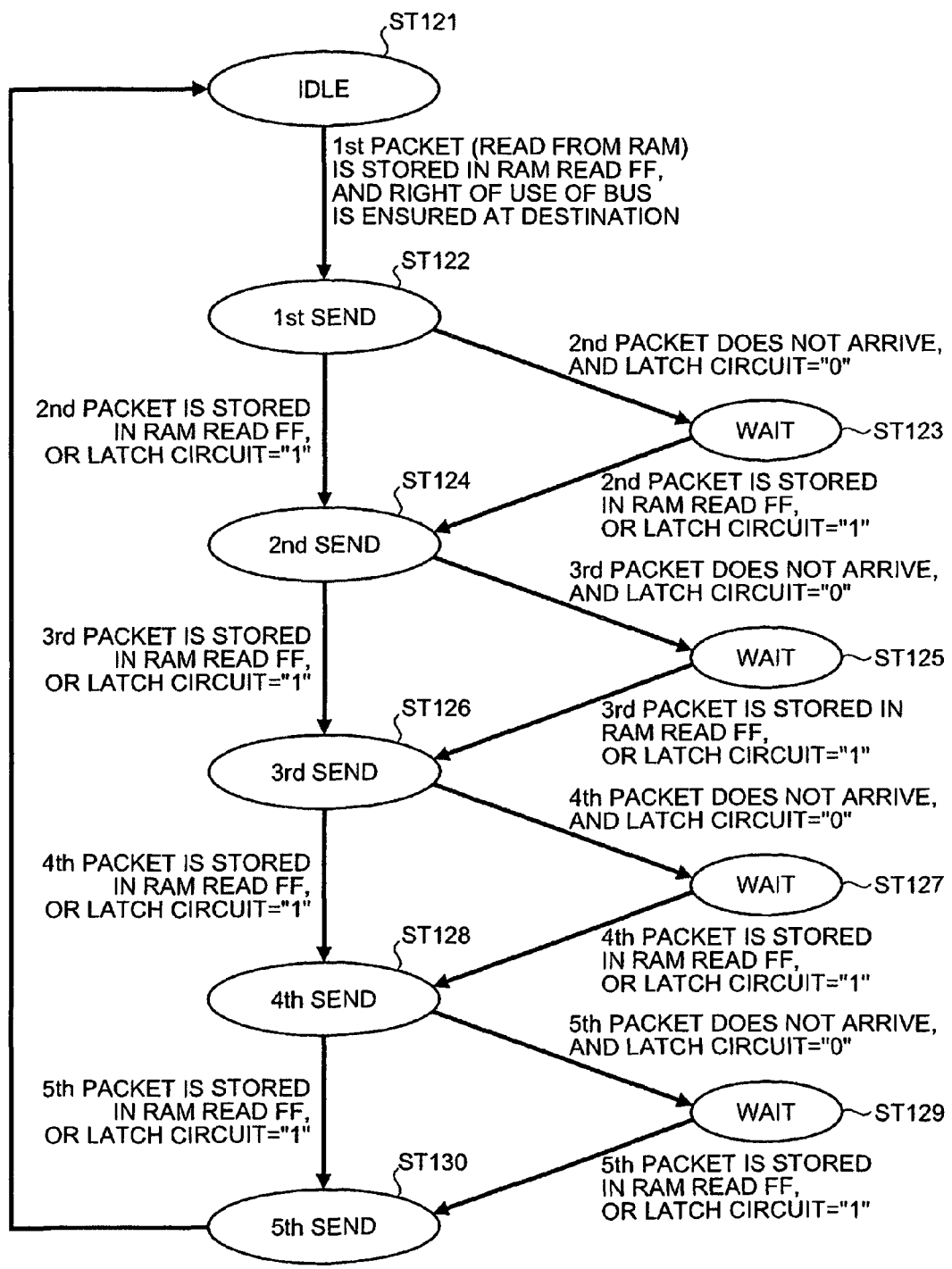
FIG. 12 is a schematic diagram for explaining a state transition of a packet read-control circuit.

A transmission process of the packet performed by the packet read-control circuit 78 is explained next. FIG. 12 depicts a state transition of the packet read-control circuit. As shown in FIG. 12, the packet read-control circuit 78 enters the idle state (IDLE in FIG. 11) when the packet is not stored in the RAM 73 (ST121). Thereafter, when the first packet is written to the RAM 73, the packet read-control circuit 78 reads the first packet stored in the RAM 73 to store the packet in the RAM read FF 74, and ensures the right of use of the bus 31 between the system controller 14a and the system controller 14b at the destination. The packet read-control circuit 78 transmits the first packet to enter the transmission state of the first packet, i.e., 1st SEND in FIG. 12 (ST122).

Figure 13:
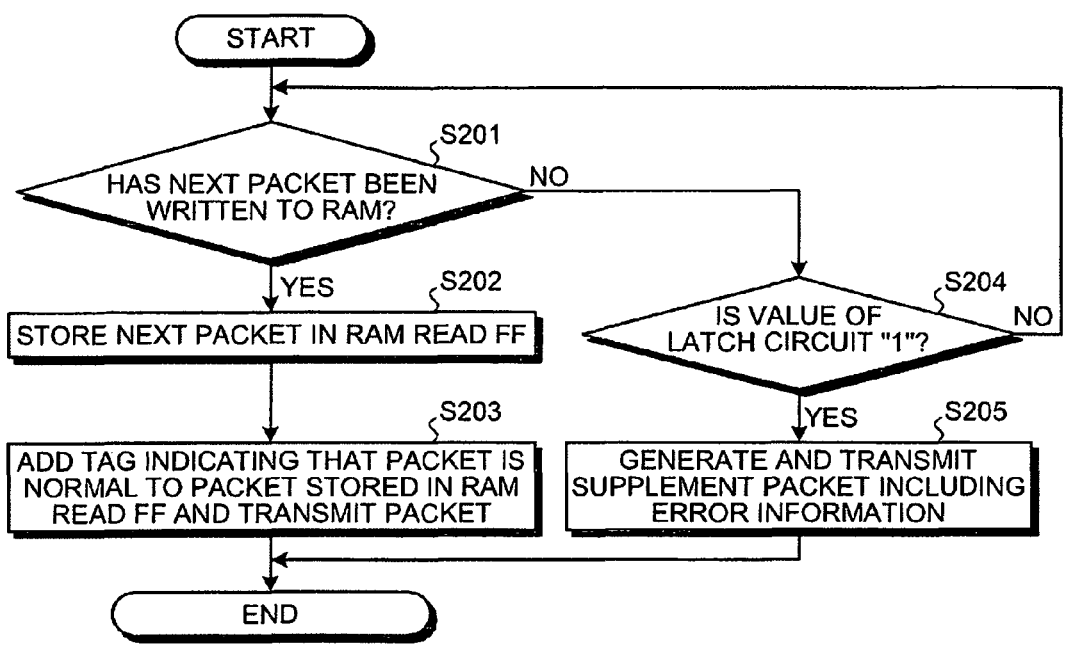
FIG. 13 is a flowchart of an example of a process procedure subsequent to a first packet transmission state of the packet read-control circuit.

FIG. 13 is a flowchart of a packet transmission process after the first packet transmission state of the packet read-control circuit. First, the packet read-control circuit 78 determines whether the next packet has been written to the RAM 73 (step S201). When the next packet has been written to the RAM 73 (YES at step S201), the packet read-control circuit 78 reads the next packet from the RAM 73 to store the next packet in the RAM read FF 74 (step S202). The packet read-control circuit 78 adds a tag indicating that the packet is normal to the next packet stored in the RAM read FF 74 and transmits the next packet (step S203). Thus, the process ends. In the packet to be transmitted at this time, "10" (2 bits) indicating that the data is normal is added as the tag 111b to the head of the packet 111a written to the RAM 73, as with the second to fifth packets 111-2 to 111-5 in FIG. 8A and the second to fourth packets 121-2 to 121-4 in FIG. 8B.

On the other hand, when the next packet has not been stored in the RAM read FF 74 (NO at step S201), the packet read-control circuit 78 determines whether the value of the latch circuit 77 is "1" (step S204). When the value of the latch circuit 77 is not "1" (NO at step S204), the process control returns to step S201 to enter the wait state until the next packet is stored in the RAM read FF 74. When the value of the latch circuit 77 is "1" (YES at step S204), the packet read-control circuit 78 generates and transmits the supplement packet including the error information (step S205), and the process ends. In the supplement packet to be transmitted at this time, "11" (2 bits) indicating that the data is abnormal is added as the tag 111b to the head of the supplement packet 111a including the error information as in the fifth packet 121-5 in FIG. 8B.

Referring back to FIG. 12, the state transition of the packet read-control circuit 78 and the process at this time are explained. In the first packet transmission state at ST122, the process shown in FIG. 13 is performed. That is, when the second packet is written to the RAM 73, the packet read-control circuit 78 reads the second packet from the RAM 73 to store it in the RAM read FF 74, and transmits the second packet to enter the second packet transmission state, i.e., 2nd SEND in FIG. 12 (ST124). On the other hand, when the latch circuit 77 corresponding to the second packet is "0" indicating that the packet is normal, in a state where the second packet is not written to the RAM 73, the packet read-control circuit 78 enters the wait state, i.e., WAIT in FIG. 12 (ST123). In the wait state, when the second packet is written to the RAM 73, the packet read-control circuit 78 reads the second packet from the RAM 73 to store it in the RAM read FF 74, and enters the second packet transmission state for transmitting the second packet (ST124).

Also with regard to the transmission process of the normal packet in the fourth packet transmission state from the second packet transmission state, after the third to fifth packets written to the RAM 73 is stored in the RAM read FF 74, they are transmitted correspondingly to the first packet transmission state at ST123 or ST124 (ST125 to ST130). However, after the transmission state (ST130) of the last packet, i.e., the fifth packet in this example, the packet read-control circuit 78 returns to the idle state at ST121.

On the other hand, when flag "1" indicating an error is set in the latch circuit 77 in each of the transmission states of the first to fourth packets (ST122, ST124, ST126, and ST128), the packet read-control circuit 78 performs the process at steps S204 to S205 in FIG. 13. That is, when the value of the latch circuit 77 is "1", the packet read-control circuit 78 transmits the supplement packet and shifts to the second to fifth transmission states (ST124, ST126, ST128, and ST130).

Also when flag "1" indicating an error is set in the latch circuit 77 in each of the wait states (ST123, ST125, ST127, and ST129), the packet read-control circuit 78 performs the process at steps S204 to S205 in FIG. 13. That is, when the value of the latch circuit 77 is "1", the packet read-control circuit 78 transmits the supplement packet and shifts to the second to fifth transmission states (ST124, ST126, ST128, and ST130).

As described above, in the case of the normal packet, the packets 111-1 to 111-5 shown in FIG. 8A are transmitted from the packet read-control circuit 78, and when the fifth packet is abnormal, the packets 121-1 to 121-5 shown in FIG. 8B are transmitted from the packet read-control circuit 78.

A status of a process flow in the respective processors performed by the system controller shown in FIG. 9 is explained with reference to a timing chart in FIG. 14. The processors (circuits) on the route along which the packet flows are sequentially plotted on a Y axis in FIG. 14. That is, a timing chart in the bus (expressed as BUS in FIG. 14) that connects the CPU 11a and the system controller, the reception FF 72, the error state FF 76, the RAM 73, the RAM read FF 74, the status of the packet read-control circuit 78, the latch circuit 77, and the transmission FF 82 is shown. Cycle (time) is denoted on an X axis.

In this example, it is assumed that the first to fifth packets of the first data 100A including five packets normally flow first from the CPU 11a in the system module 10a to the bus 21a, and after one cycle, the first to fifth packets of the second data 100B including five packets flow from the CPU 11a in the system module 10a to the bus 21a. However, a case that the fifth packet in the second data 100B does not reach the system controller 14a due to a fault on the CPU 11a or the bus 21a after transfer of the fourth packet is explained below. That is, a process in a case that the second data 100B including an abnormal packet is transmitted between the system modules 10a and 10b after transmission of the normal first data 100A is explained.

In the reception FF 72, the first packet of the first data 100A is received from the CPU 11a one cycle behind the bus 21a. The packet write-control circuit 75 monitors the received first data 10A, however, the packet write-control circuit 75 does not determine that the second to fifth packets of the first data 100A are abnormal, because the next packet is received within the predetermined time since receipt of the previous packet. Accordingly, nothing is written to the error state FF 76. Because there is no error in the received packets, the packet write-control circuit 75 sequentially writes the received first to fifth packets to the RAM 73 one cycle behind the reception FF 72. Nothing is written to the error state FF 76; however, as shown in FIG. 14, "0" is set, synchronized with the write of the packet to the RAM 73.

The packet written to the RAM 73 is read and stored in the RAM read FF 74 two cycles behind the RAM 73. The content of the error state FF 76 corresponding to the packet stored in the RAM read FF 74 is written to the latch circuit 77 one cycle behind the error state FF 76.

On the other hand, the packet read-control circuit 78 is in the idle state until the packet is stored in the RAM read FF 74; however, when the data of the first packet is written to the RAM read FF 74, the packet read-control circuit 78 refers to the value of the latch circuit 77 to enter a packet transmission state. That is, the packet read-control circuit 78 repeatedly performs such a process that the packet read-control circuit 78 transmits the first packet at time "5" because the value of the latch circuit 77 is "0" at time "4" corresponding to the first packet of the first data 100A, and transmits the second packet at time "6" because the value of the latch circuit 77 is "0" at time "5" corresponding to the second packet, until the fifth packet is transmitted. The transmission FF 82 sequentially transmits the first to fifth packets to the bus 31 one cycle behind of the RAM read FF 74. The transmission process of the first data 100A including the normally received packets finishes in this manner.

Thereafter, the first to fourth packets of the second data 100B transmitted from the CPU 11*a* to the bus 21*a* at time "7" are transmitted in the same manner. However, the fifth packet to be originally transmitted from the CPU 11*a* at time "10" does not arrive at the reception FF 72. Because the fifth packet originally expected to arrive at time "12" does not arrive, the packet write-control circuit 75 sets a flag in the storage area 761 corresponding to the fifth packet of the error state FF 76 at time "13" (the error state FF 76 is made valid (written as valid in FIG. 14)). Simultaneously, because the data does not arrive at the RAM 73, the write process performed by the packet write-control circuit 75 is not performed at time "13". Thereafter, the flag in the storage area 761 of the error state FF 76 corresponding to the fifth packet is reflected on the latch circuit 77 one cycle behind (i.e., time "14").

Accordingly, the packet read-control circuit 78 confirms that the flag is set in the latch circuit 77 (made "valid") for the fifth packet at time "14", and generates the supplement packet including the error information at time "15" instead of the fifth packet, which is not stored in the RAM read FF 74, to transmit the supplement packet. Thereafter, the packet read-control circuit 78 enters the idle state, and the supplement packet including the error data is transmitted to the bus 31 at time "16". Thus, the transmission process of the second data 100B including the abnormal packet finishes.

As described above, according to the embodiment, even when a packet to be originally transmitted is not received by the system controller 14*a* due to an error in the processor of the sender of the packet or in the bus 21*a* connecting between the processor and the system controller 14*a*, the error is detected and a supplement packet is generated and transmitted instead of the packet to the system controller 14*b* at the destination. Accordingly, even when the data has an error, such a state that the bus between the system modules 10*a* and 10*b* is not released due to the error can be avoided, and therefore the processing in the whole system is not interrupted due to the error. As a result, even when a packet is lost due to a fault in the processors (large-scale integration: LSI) or in the bus 21 (transmission line) connecting between the processors and the system controllers 14*a* and 14*b*, the influence thereof can be limited in the multiprocessor system.

Moreover, because the transmission process is started immediately after the received packet is written to the packet temporary-storage unit 54 (the RAM 73), an increase of the latency in the system controllers 14*a* and 14*b* can be suppressed as compared with a case that the transmission process of the packet is started after all the packets can be received.

As set forth hereinabove, according to an embodiment of the present invention, instead of a packet that cannot be received normally due to a fault in the processor or the first transmission line, a supplement packet including error information of the packet is generated and transmitted to the second transmission line. Accordingly, packet transmission using the second transmission line in the system controller can be normally finished in view of the protocol between the system controller and the destination system controller. As a result, the fault in the processor or the first transmission line does not interrupt the processing in the entire multiprocessor system.

Further, the error information is stored for the packet that cannot be received normally, and the packet received from the processor is transmitted to the second transmission line based on the error information. Therefore, transmission to the second transmission line can be separately performed for each packet. Besides, because the received packet is transmitted immediately, the latency in the system controller can be reduced as compared with the case that after all the packets have been received, only the data that does not include an abnormal packet is transmitted to the second transmission line.

Still further, the received-packet write controller processes all the packets after the packet, which cannot be received normally, as a reception error. Therefore, the reception process from the processor can be simplified in the series of data including even one packet as the reception error.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system module comprising:
a plurality of processors each including a plurality of central processing units; and
a system controller that is connected to the processors via a first transmission line and relays a packet from each of the processors to another system module via a second transmission line, wherein
the system controller includes a data transmission controller for each of the processors connected via the first transmission line,
when a packet of packets constituting a series of data transmitted from a processor is not received normally by the data transmission controller due to a fault in the processor or the first transmission line, the data transmission controller generates an error packet instead of the packet that is not received normally and outputs the error packet to the second transmission line, the error packet indicating the fault in the processor or the first transmission line, and
when the packet of packets from the processor is received normally, the data transmission controller outputs the received packet to the second transmission line.

2. The system module according to claim 1, wherein the data transmission controller includes
a temporary storage unit that stores therein packets received from the processors via the first transmission line;
an error-information storage unit that stores therein error information indicating error in receipt of a packet that has not been received normally from the processor;
a write control unit that monitors packets from the processors, and, when a packet is received normally, writes the packet to the temporary storage unit while, when a packet is not received normally, writes error information as to the packet to the error-information storage unit; and a read control unit that, when a packet is stored in the temporary storage unit, determines whether the packet has been received normally based on the error information, and, when the packet has been received normally, reads the packet from the temporary storage unit to output the packet to the second transmission line while, when the packet has not been received normally, generates a supplement packet indicating error to output the supplement packet to the second transmission line.

3. The system module according to claim 2, wherein the write control unit writes, when part of packets constituting a series of data transmitted from a processor is not received normally, error information indicating error in receipt of all packets received after a first packet that has not been received normally to the error-information storage unit.

4. A data relay method applied to a system module that includes a plurality of processors each including a plurality of central processing units, and a system controller connected to the processors via a first transmission line and relays a packet from each of the processors to another system module via a second transmission line, the method comprising, in the system controller:

generating, when a packet of packets constituting a series of data transmitted from a processor is not received normally due to a fault in the processor or the first transmission line, an error packet instead of the packet that is not received normally, the error packet indicating the fault in the processor or the first transmission line;

outputting, when the packet of packets from the processor is not received normally, the error packet generated at the generating to the second transmission line; and outputting, when the packet of packets from the processor is received normally, the received packet to the second transmission line.

5. The data relay method according to claim 4, further comprising, in the system controller:

storing error information indicating error in receipt of a packet for each of packets constituting a series of data transmitted from the processor that has not been received normally;

outputting a packet that has been received normally to the second transmission line based on the error information;

generating a supplement packet indicating error as a supplement for a packet that has not been received normally based on the error information; and outputting the supplement packet to the second transmission line.

6. The data relay method according to claim 5, further comprising the system controller generating, when part of packets constituting a series of data transmitted from a processor is not received normally, error information indicating error in receipt of all packets received after a first packet that has not been received normally.

* * * * *